US007927392B2

(12) United States Patent
Clements et al.

(10) Patent No.: US 7,927,392 B2
(45) Date of Patent: Apr. 19, 2011

(54) TWIST AND LOCK CONNECTION FOR PLEATED FILTER ELEMENT WITH FLANGE-TO-FLANGE LOCKING MEANS

(75) Inventors: Jack T. Clements, Lee's Summit, MO (US); Gerry E. Maddocks, Bracebridge (CA)

(73) Assignee: BHA Group, Inc., Kansas City, MO (US)

( * ) Notice: Subject to any disclaimer, the term of this patent is extended or adjusted under 35 U.S.C. 154(b) by 240 days.

(21) Appl. No.: 12/259,648

(22) Filed: Oct. 28, 2008

(65) Prior Publication Data

US 2010/0101195 A1      Apr. 29, 2010

(51) Int. Cl.
*B01D 46/02*      (2006.01)
(52) U.S. Cl. .................... 55/341.1; 55/378; 55/379
(58) Field of Classification Search ............. 55/341.1, 55/341.4, 341.6, 372, 360, 374, 341.5, 378, 55/379; 210/234; 95/59, 63, 70; 96/55
See application file for complete search history.

(56) References Cited

U.S. PATENT DOCUMENTS

| 4,288,012 A * | 9/1981 | Doak ........................ 294/143 |
| 5,261,934 A * | 11/1993 | Shutic et al. .................. 95/280 |
| 5,746,792 A | 5/1998 | Clements |
| 6,203,591 B1 | 3/2001 | Clements |
| 6,233,790 B1 | 5/2001 | Carothers |
| 6,375,698 B1 * | 4/2002 | Clements et al. ............ 55/341.1 |
| 6,676,722 B1 * | 1/2004 | Clements et al. ............... 55/378 |
| 2005/0205484 A1 * | 9/2005 | Diel .......................... 210/323.1 |
| 2006/0032197 A1 * | 2/2006 | Pyron ........................... 55/372 |
| 2008/0120949 A1 | 5/2008 | Welch |

FOREIGN PATENT DOCUMENTS

| DE | 102007057304 A1 | 5/2008 |
| EP | 0487831 A1 | 6/1992 |
| FR | 2127360 A5 | 10/1972 |
| WO | 2004020072 A1 | 2/2004 |

OTHER PUBLICATIONS

European Search Report dated Jan. 15, 2010.

* cited by examiner

*Primary Examiner* — Duane Smith
*Assistant Examiner* — Thomas McKenzie
(74) *Attorney, Agent, or Firm* — Pearne & Gordon LLP

(57) ABSTRACT

A baghouse and filter assembly are provided for at least partially removing particulate matter from a gas stream. The filter assembly includes first and second filter portions to be coupled together by a coupler for establishing fluid communication between the first and second filter portions when connected. The coupler includes a first coupling portion including a side wall defining an interior passage through which the gas stream can pass in an axial direction between the first and second filter portions, and one or more flanges projecting from said side wall, the one or more flanges supporting a plurality of male studs. The coupler further includes a second coupling portion including a plurality of female keyhole-shaped receivers spaced apart for receiving at least a portion of the male studs and coupling the first coupling portion to the second coupling portion.

17 Claims, 3 Drawing Sheets

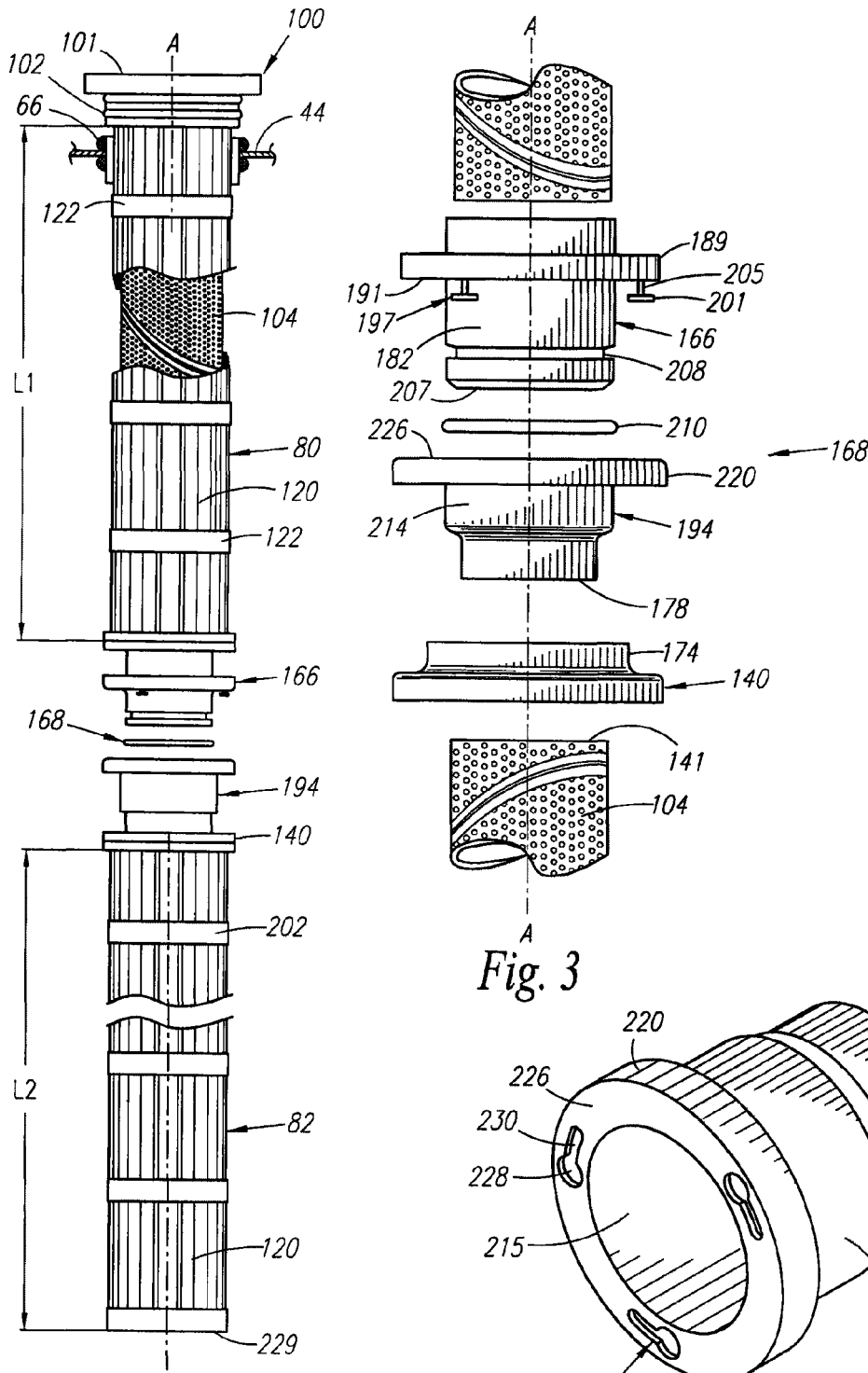

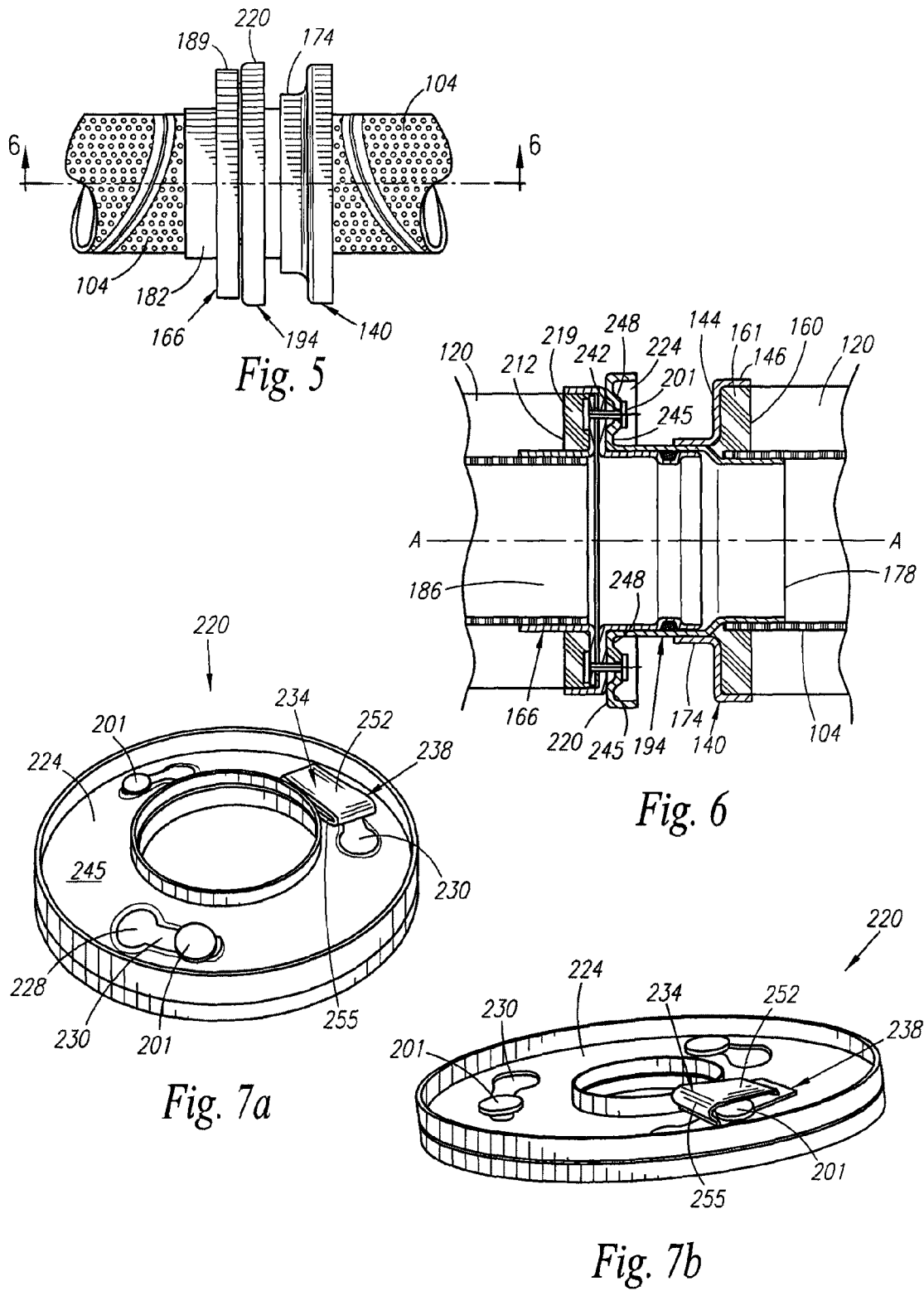

TWIST AND LOCK CONNECTION FOR PLEATED FILTER ELEMENT WITH FLANGE-TO-FLANGE LOCKING MEANS

FIELD OF THE INVENTION

The present invention relates generally to a filter assembly for use in a baghouse. In particular, the present invention relates to connecting structure for a multi piece filter assembly having pleated filter elements.

BACKGROUND OF THE INVENTION

There is increasing environmental regulatory control throughout the world. Much of the regulatory control is focused on reducing air-borne pollutants and emissions from certain industrial sources, such as power plants and materials production facilities. A known technique to control the pollutants and emissions from the industrial sources is to separate undesirable particulate matter that is carried in a gas stream by fabric filtration. Such fabric filtration is accomplished in a dust collection apparatus known in the industry as a "baghouse."

The baghouse typically includes a housing divided into two plenums by a tube sheet. One plenum is a "dirty air" plenum which communicates with an inlet and receives "dirty" or particulate laden gas from a source at the plant. The other plenum is a "clean air" plenum which receives cleaned gas after filtration and communicates with an outlet to direct cleaned gas away from the baghouse. A plurality of relatively long cylindrical fabric filters, commonly called "bags," are suspended from the tube sheet in the dirty air plenum. Each bag has a closed lower end and is installed over a cage. Each bag is mounted to the tube sheet at its upper end and hangs vertically downward into the dirty air plenum. The upper end portion of the bag is open and the interior of each bag is in fluid communication with the clean air plenum.

In operation, particulate laden gas is conducted into the dirty air plenum. As the particulate laden gas flows through the baghouse, the particulates carried by the gas engage the exterior of the fabric filter bags and accumulate on or in media of the fabric filter bags or are separated from the gas stream and fall into an accumulator chamber at the lower portion of the dirty air plenum. Cleaned gas then flows through the media of the fabric filter bags, into the interior of the fabric filter bags, to the clean air plenum and through the outlet. Although many baghouses are made according to this basic structure, there may be numerous operational and structural differences among baghouses.

There is interest in replacing known fabric filter bags with pleated media filter cartridges to increase the effective filtering area while occupying the same, or less, space within the baghouse. However, certain barriers to easy replacement of fabric filter bags by pleated media filter cartridges exist. In some baghouse designs, the fabric filter bags can have a length of about four meters. The clean air plenum often has a clearance height that is substantially less than four meters, for example, about two meters. It is generally not a problem to install fabric filter bags in the baghouse since the fabric filter bags are foldable, flexible and non rigid. A relatively long and rigid pleated media filter cartridge cannot be installed without considerable manipulation if it can be installed at all due to the limited access space in the clean air plenum.

In order to occupy the same space within the baghouse as a fabric filter bag, the length of the pleated media filter cartridge would be relatively long and can be up to about four meters in length or more. This presents a problem for filter manufacturers because there are effective limits as to the width of the filter media that can be pleated with current production machinery. The current production machinery used to pleat filter media typically cannot accommodate continuous filter media more than about two meters in width. Such a long filter cartridge would also be relatively difficult to handle, transport and install.

Conventional connector structures have included compatibly-threaded portions that are screwed together to connect two axially aligned filter portions. Such threaded connectors are difficult to connect when there are imperfections in the threads themselves, and efforts to minimize formation of such imperfections during manufacturing have proven to be expensive. And despite best efforts to minimize such imperfections during manufacturing, an unacceptable number of incompatibly-threaded connectors that will be difficult to connect may still result. Accordingly, there is a need in the industry for improvements in filter structure, including a connector for coupling a plurality of axially aligned filter portions together.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some aspects of the invention in a simplified form as a prelude to the more detailed description that is presented later.

In accordance with one aspect, the present invention provides a filter assembly to be secured within a baghouse for removing at least a portion of particulate matter entrained within a gas stream. The baghouse is divided into a plurality of plenums by a tube sheet that defines at least one opening through which the gas stream can travel between the plenums. The filter assembly includes a first filter portion including a mounting structure provided adjacent to a first axial end to couple the first filter element to a support adjacent to the at least one opening defined by the tube sheet, a first perforated frame coupled to and extending from the mounting structure, and a first pleated filter media disposed adjacent to the first perforated frame. The filter assembly further includes a second filter portion including a second perforated frame and a second pleated filter media disposed adjacent to the second perforated frame. A coupler is provided for connecting the first filter portion to the second filter portion and establishing fluid communication between the first and second filter portions when connected. The coupler includes a first coupling portion including a side wall defining an interior passage through which the gas stream can pass in an axial direction between the first and second filter portions, and one or more flanges projecting from the side wall. The one or more flanges collectively support a plurality of male studs projecting therefrom. A second coupling portion is also included as part of the coupler, and includes a plurality of female keyhole-shaped receivers spaced apart for receiving at least a portion of the male studs and coupling the first coupling portion to the second coupling portion.

In accordance with another aspect, the present invention provides a baghouse for filtering at least a portion of particulate matter from a gas stream. The baghouse includes a housing divided into at least first and second plenums by a substantially planar tube sheet defining a plurality of openings establishing gaseous communication between the first and second plenums, and a plurality of filter assemblies to be secured adjacent to the openings defined by the tube sheet. The filter assemblies include a first filter portion including a mounting structure provided adjacent to a first axial end to couple the first filter element to a support adjacent to the at least one opening defined by the tube sheet, a first perforated frame coupled to and extending from the mounting structure, and a first pleated filter media disposed adjacent to the first perforated frame. The filter assemblies also include a second filter portion including a second perforated frame and a second pleated filter media disposed adjacent to the second perforated frame. A coupler is included for connecting the first filter portion to the second filter portion and establishing fluid communication between the first and second filter portions when connected. The coupler includes a first coupling portion including a side wall defining an interior passage through which the gas stream can pass in an axial direction between the first and second filter portions, and one or more flanges projecting from said side wall, said one or more flanges supporting a plurality of male studs. A second coupling portion included as part of the coupler includes a plurality of female keyhole-shaped receivers spaced apart for receiving at least a portion of the male studs and coupling the first coupling portion to the second coupling portion.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is an exploded elevational view of a filter assembly according to an aspect of the invention;

FIG. 3 is an exploded view of a coupler for connecting first and second filter portions according to an aspect of the invention;

FIG. 4 is a perspective view of an axial end of a coupling portion including a plurality of keyhole-shaped receivers for receiving male studs provided to another coupling portion to couple a first filter portion to a second filter portion;

FIG. 5 is an assembled view of the coupler illustrated in FIG. 3;

FIG. 6 is a sectional view of the assembled coupler in FIG. 5 taken along line 6-6;

FIG. 7a is a perspective view of a retaining clip engaged with a male stud to interfere with removal of the male stud from a keyhole-shaped receiver; and FIG. 7b is a perspective view of a retaining clip engaged with a male stud to interfere with removal of the male stud from a keyhole-shaped receiver.

DESCRIPTION OF EXAMPLE EMBODIMENTS

Figure 1:
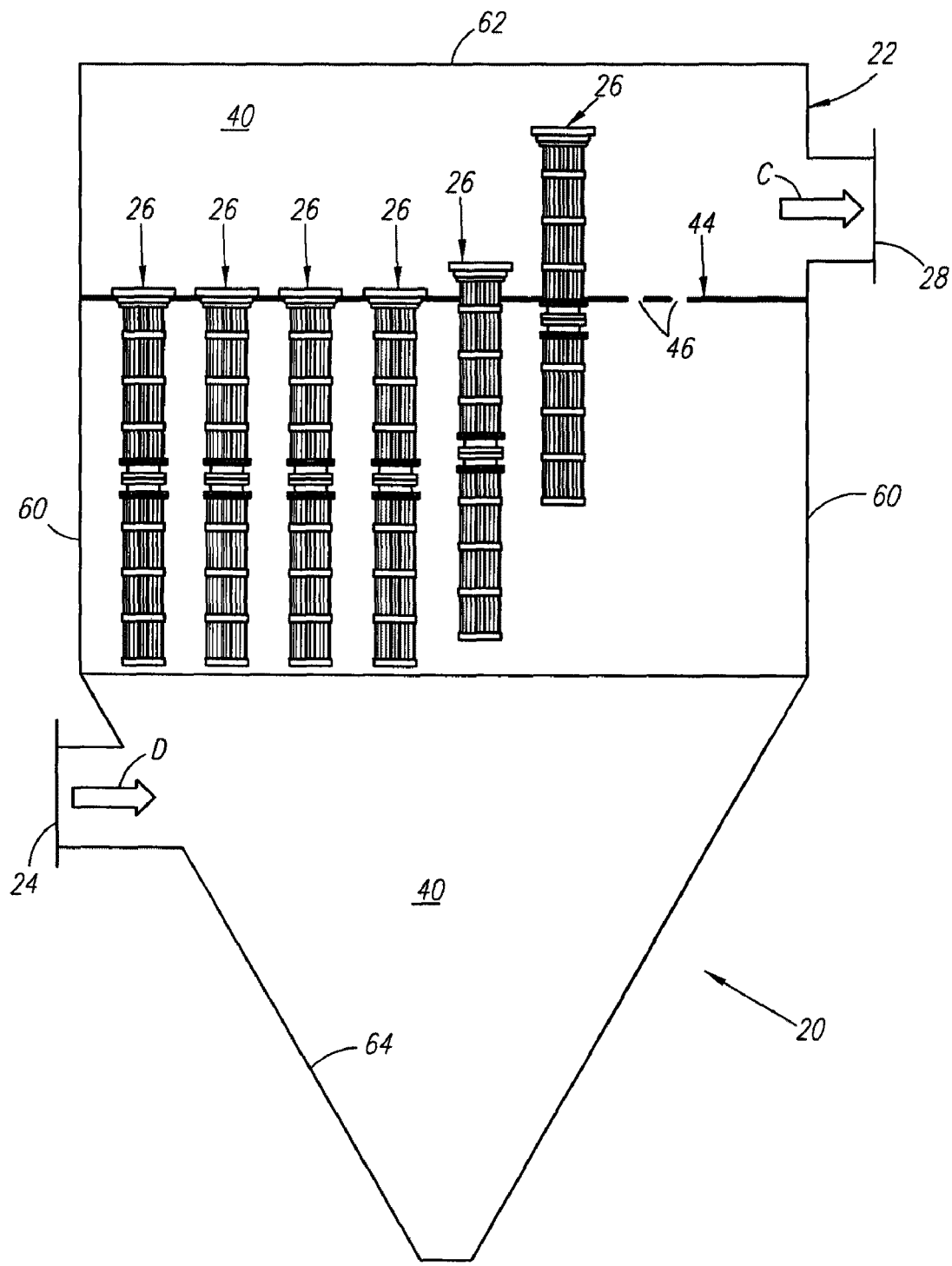
FIG. 1 is a schematic view of the interior of a baghouse in which a plurality of filter assemblies are top loaded for at least partially removing particulate matter entrained within a gaseous stream.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

A baghouse 20 is illustrated in FIG. 1. The baghouse 20 is defined by an enclosed housing 22. The housing 22 is made from a suitable material, such as sheet metal. Particulate laden gas D flows into the baghouse 20 from an inlet 24. The particulate laden gas D is filtered by a plurality of relatively long cartridges or filter assemblies 26 (best seen in FIG. 2) constructed according to one aspect of the invention located within the baghouse 20. Cleaned gas C exits through an outlet 28 of the baghouse 20.

The baghouse 20 is divided into a "dirty air" plenum 40 and a "clean air" plenum 42 by a tube sheet 44 made from a suitable material, such as sheet metal. The tube sheet 44 has at least a portion that is substantially planar. The inlet 24 is in fluid communication with the dirty air plenum 40. The outlet 28 is in fluid communication with the clean air plenum 42.

A plurality of openings 46 extend through the planar portion of the tube sheet 44. A filter assembly 26 is installed in a respective opening 46, and can optionally extend at least partially through the respective opening 46. The filter assembly 26 can be suspended by the tube sheet 44 itself, or any other suitable support adjacent to the openings 46 in which the filter assembly 26 is to be installed. The clean air plenum 42 has a minimum dimension or clearance height taken in a direction normal to the tube sheet 44 that defines an access space. The dirty air plenum 40 has a height taken in a direction normal to the tube sheet 44 in which a filter assembly 26 can be installed without engaging the housing 22 of the baghouse 20. The height of the dirty air plenum 40 is typically greater than the height of the clean air plenum 42.

The housing 22 of the baghouse 20 includes sides 60 and a roof 62. The baghouse 20 is illustrated as having a non-movable roof 62. Thus, access to the clean air plenum 42 and baghouse 20 is limited for installation of the filter assemblies 26. It will be apparent to one skilled in the art that the roof 62 can have access panels that are removable or movable to a position that does not inhibit access to the clean air plenum 42.

The baghouse 20 also has an accumulation chamber defined by sloped walls 64 located at a lower end of the dirty air plenum 40. The filter assemblies 26 are illustrated as not extending into the accumulation chamber but it will be apparent that the filter assemblies may extend into the accumulation chamber.

A circumferentially-resilient mounting band 66 (FIG. 2) is located in one of the openings 46 in the tube sheet 44. The band 66 is made from metal, such as a stainless steel, and is covered with fabric. The band 66 is constructed with an outer diameter substantially equal to the inner diameter of the opening 46. The band 66 may be easily deformed from its normally circumferential shape and inserted into the opening 46. The exterior surface of the band 66 snugly engages the surface defining the opening 46. The band 66 provides a seal between the filter assembly 26 and the opening 46 in the tube sheet 44 to minimize the passage of gas from the dirty air plenum 40 into the clean air plenum 42 between the filter assembly 26 and the tube sheet 44.

The filter assemblies 26 filter particulates from the particulate laden gas D as the gas D passes through each filter assembly 26. Each filter assembly 26 is made up of at least a first or upper filter portion 80 (as viewed in FIG. 2) and a second or lower filter portion 82. The filter portions 80, 82 are axially aligned in an end-to-end stack and connected together in a fluid tight relationship by a coupler 168.

Each filter assembly 26 is supported at its upper end (as viewed in FIGS. 1 and 2) by the tube sheet 44 and hangs downwardly in a substantially vertical direction. A tubular mounting sleeve 100 is located at the upper end (as viewed in FIG. 2) of the filter assembly 26 and bears the entire weight of the filter assembly 26 when disposed between the mounting sleeve 100 and the tube sheet 44. The mounting sleeve 100 has an outer diameter that is greater than the outer diameter of the band 66.

Each filter assembly 26 has a longitudinal central axis A-A, and an overall length taken in a direction parallel to the axis A-A. The length of the filter assembly 26 is greater than the clearance height of the clean air plenum 42 and preferably less than the access height of the dirty air plenum 40 at least in the location closest to the inner periphery of the housing 22. It will be apparent that any number and lengths of filter assemblies 26 could be utilized that are suitable to the filtering requirements of the baghouse 20.

The length of the filter assembly 26 can be any desired length that is appropriate for particular filtering requirements. In one example, at least one of the first and second filter portions 80, 82 of the filter assembly 26 has a length in the range of one meter to three meters. Preferably, the length of the filter portion 80 or 82 is less than the clearance height in the access space of the clean air plenum 42. It will also be apparent that the length of the first filter portion 80 can be different from the length of the second filter portion 82.

The first filter portion 80 is open at both axial ends 101, 105, as illustrated in FIG. 2. The mounting sleeve 100 is located at an upper axial end 101 (as viewed in FIG. 2) of the first filter portion 80 to attach the first filter portion 80 and filter assembly 26 to the tube sheet 44. The mounting sleeve 100 is made from a suitable material, such as stamped, drawn or otherwise formed metal. The mounting sleeve 100 defines an open axial end 101 of the first filter portion 80 for fluid communication with the clean air plenum 42. The first filter portion 80 has a generally-circular cross section, thereby forming a substantially-tubular interior passageway between the dirty air plenum 40 and the clean air plenum 42.

The filter assembly 26 extends through a respective opening 46 in the tube sheet 44 and through the band 66. The band 66 ensures that the filter assembly 26 may be used with openings 46 that have not been precisely cut, allowing for a suitable manufacturing tolerance without significantly affecting the performance of the baghouse 20 due to leakage between the tube sheet 44 and the filter assemblies 26. The mounting sleeve 100 defines an inverted cup portion that receives a part of the band 66.

The mounting sleeve 100 has a tubular portion 102 (FIG. 2) that is adapted to be located within and extend through a respective opening 46 in the tube sheet 44 and the band 66. A tubular support frame 104 (FIGS. 2 and 5) is fixed to and extends from the tubular portion 102 of the mounting sleeve 100. The support frame 104 is made from a suitable material, such as perforated sheet metal, expanded metal or mesh screen. The upper end of the support frame 104 and the mounting sleeve 100 sleeve are connected together in a suitable manner, such as by welds, rivets, fasteners or metal deformation. Thus, a relatively strong structure exists that is capable of supporting the weight of the filter assembly 26 as it hangs from the tube sheet 44 even when the filter assembly 26 has a relatively heavy accumulation of particulates.

Pleated filter media 120 provided to the first filter portion 80 is located concentrically around the support frame 104. The pleated filter media 120 is formed in a substantially tubular shape about the perimeter of the support frame 104 with accordion folds at its inner and outer peripheries. The pleated filter media 120 of the first filter portion 80 has an effective filtering length or axial extent L1 (FIG. 2), while the pleated filter media 120 of the second filter portion 82 has an effective filtering length or axial extent L2. The pleated filter media 120 may be constructed of any suitable material for a desired filtering requirement. The support frame 104 supports the pleated filter media 120 in a radial direction. The upper end of the pleated filter media 120 is also located in the mounting sleeve 100 and secured therein by a potting material, which acts to seal the pleated filter media 120 and the mounting sleeve 100, as well as resist separation of the pleated filter media 120 from the mounting sleeve.

The first filter portion 80 is illustrated as having media retention devices 122 extending circumferentially about the pleated filter media 120. The retention devices 122 serve to hold the pleated filter media 120 in place during reverse pulse-jet cleaning.

Similar to the first filter portion 80, the second filter portion 82 includes a perforated tubular support frame 104 (FIGS. 3-5) circumferentially surrounded by the pleated filter media 120. The pleated filter media 120 is disposed about and radially supported by the support frame 104. Potting material 161 (FIG. 6) is disposed within a cup part 160 defined between a collar 140 and a lower coupling portion 194 described below. An axial end of the pleated filter media 120 is received within the cup part 160 and the potting material 161 to resist separation of the pleated filter media 120 from the lower coupling portion 194.

The first and second filter portions 80, 82 are illustrated as having media retention devices 122, 202, respectively, extending circumferentially about the pleated filter media 120. The retention devices 122, 202 serve to hold the pleated filter media 120 in place during reverse pulse-jet cleaning.

A plate 229 is located at the lower end (as viewed in FIG. 2) of the second filter portion 82 to define a closed end of the second filter portion 82 and the filter assembly 26. The plate 229 is preferably fixed to the tubular support frame 104. Potting compound is located between the exterior of the lower end of the pleated media 120 and the plate 229 to form a seal.

The collar 140 is fixed to the support frame 104 adjacent a proximate axial end 141 (as viewed in FIGS. 2 and 3) of the second filter portion 82, and defines an interior passage in which a portion of the lower coupling portion 194 is received. The collar 140 is made from a suitable material, such as metal, and can be connected to the support frame 104 in any suitable manner, such as by welds, rivets, bolts and other mechanical fasteners, metal deformation, and the like. Thus, a relatively strong structure is provided which is capable of supporting the weight of one or more filter portions, such as the second filter portion 82, for example, that may be connected to the first filter portion 80 even when those filter portions have acquired a heavy accumulation of particulates.

A flange portion 144 (FIG. 6) is located near a lower axial end of the collar 140 (relative terms such as "upper" are best understood with reference to the filter assembly 26 suspended from the tube sheet 44 as shown in FIG. 1, and as enlarged in FIGS. 2 and 3) and extends radially outward from the collar 140. By "radially" outward, it is meant that the flange portion 144 extends outwardly, generally away from longitudinal central axis A-A in a radial direction as indicated by the arrow 200 in FIG. 5, which can be rotated entirely about axis A-A. A side wall 146 extends at an approximate right angle from the outer periphery of the flange portion 144 and extends downward in an axial direction parallel to axis A-A when the filter assembly 26 is suspended from the tube sheet 44. The cup part 160 opens downward to receive the axial end of the pleated filter media 120 and potting material 161. The cup part 160 (FIG. 6) is defined between the collar 140 and at least one of the lower coupling portion 194 and the support frame 104. The structure of the collar 140 defining the cup part 160 is provided by any suitable means, such as spot welds, for example, or can be formed as a monolithic unit with the collar 140 by bending the material forming the flange portion 144, or can be formed in any other suitable manner.

Potting material 161 is located between the exterior of the lower end of the pleated media 120, the flange portion 144 and side wall 146 within the cup part 160 to resist removal of the pleated filter media 120 from the cup part 160. The side wall 146 can optionally have a rolled bead projecting into the potting material to further resist removal.

The collar 140 can optionally be removably coupled to, or integrally formed as a monolithic structure as part of the lower coupling portion 194 included as part of the coupler 168 for connecting the first filter portion 80 to the second filter portion 82, as illustrated in FIGS. 3, 5 and 6. For the embodiment shown in FIG. 3, the collar 140 includes a sleeve portion 174 defining an interior passage that is separate from the lower coupling portion 194, and concentrically aligned to mate with the lower coupling portion 194 along axis A-A. The sleeve portion 174 can be telescopically slid onto the lower coupling portion 194 during assembly, thereby allowing a distal end 178 (FIGS. 3 and 6) of the lower coupling portion 194 to extend into the sleeve portion and thereby at least partially define an inner periphery of the cup part 160. So defined, the cup part 160 includes an annular shape in which the potting material 161 can be disposed along with an end of the pleated filter media 120 provided to the second filter portion 82.

The upper coupling portion 166 in FIGS. 3, 5 and 6 includes a peripheral, and generally tubular side wall 182 concentrically aligned along axis A-A when assembled as a portion of the coupler 168 to at least partially define an interior passage 186 between the first and second filter portions 80, 82. At least one flange 189 projects from said side wall, and includes a generally planar mating surface 191 that engages a corresponding mating surface 226 provided to the lower coupling portion 194 when the coupler 168 is assembled to connect the first and second filter portions 80, 82 as described below. According to the embodiment shown in FIG. 3, a single flange 189 projects from the side wall 182 of the upper coupling portion 166, and extends circumferentially around the entire angular extent of the side wall 182 about axis A-A. The flange(s) 189 are set back, spaced a distance apart from an axial end 207 of the upper coupling portion 166 along axis A-A. Thus, when the coupler 168 is assembled the axial end 207 of the upper coupling portion 166 telescopically extends at least partially into the lower coupling portion 194 to create an overlap between the upper and lower coupling portions 166, 194.

The one or more flanges 189 collectively support a plurality (e.g., three) of male studs 197 that, according to an embodiment of the invention, are distributed approximately 120° from each other about axis A-A. Other distribution patters are also within the scope of the invention. Each male stud 197 projects from the flange 189 in an axial direction substantially parallel to axis A-A toward the lower coupling portion 194 when the upper and lower coupling portions 166, 194 are axially aligned to couple the first and second filter portions 80, 82 together. Each male stud 197 can be formed from a metal or other material that can withstand the forces imparted thereon to connect the upper and lower coupling portions 166, 194.

The male studs 197 have a generally T-shaped cross section as shown in FIG. 3, and includes a head 201 supported an axial distance from the mating surface 191 by a post 205. The protruding male studs 197 have a lateral dimension, which in this example is a width of the head 201, that is substantially larger than a lateral dimension of the post 205 extending between the head 201 and the mating surface 191. The male studs 197 can be secured to the flange 189 or other portion of the upper coupling portion 166 by any suitable method of joining metals such as welding, braising through the use of a threaded connector, or other suitable manner.

According to an embodiment of the invention shown in FIG. 6, the male studs 197 are braised to the flange 189 within a cup part 212 defined by the flange 189. Each of these male studs 197 extends through the mating surface 191 of the flange 189 and extends in a direction generally parallel to axis A-A as described above toward the lower coupling portion 194. Similar to the cup part 160 defined at least partially by the collar 140, the cup part 212 can also receive an axial end of the pleated filter media 120 and be filled with a potting material 219 to resist separation of the pleated filter media 120 from the upper coupling portion 164.

The upper coupling portion 166 also includes a channel 208 recessed within the side wall 182, and extends about the circumference of the upper coupling portion 166. A compressible, o-ring gasket 210 is situated within the channel 208 when the upper and lower coupling portions 166, 194 are connected to form a generally gas-tight seal between the upper and lower coupling portions 166, 194. The gasket 210 is compressed in the region of the overlap between the upper and lower coupling portions 166, 194 as the upper and lower coupling portions 166, 194 are coupled together. According to alternate embodiments, the gasket 210 can be disposed within a channel (not shown) recessed within an interior peripheral wall of the lower coupling portion 194 instead of, or in addition to, the external periphery of the side wall 182 of the upper couping portion 166.

The lower coupling portion 194 as shown in FIG. 4 includes a generally tubular peripheral side wall 214 or sleeve formed from a metal or other suitably durable and rigid material. The side wall 214 defines an interior passage 215 for receiving the axial end 207 of the upper coupling portion 166 when the upper coupling portion 166 mates with the lower coupling portion 194. The gas stream also passes through the interior passage 215 between the first and second filter portions 80, 82 when the coupler 168 is assembled.

At least one flange 220 radially projects from the side wall 214 and defines a plurality of keyhole-shaped receivers 217. For the embodiment including three equally distributed male studs 197, each spaced 120° from each other about axis A-A, the receivers 217 can be compatibly distributed about the flange 220 to receive the equally spaced male studs 197.

Each receiver 217 is keyhole shaped, including an enlarged entry aperture 228 through which the head 201, with its large lateral dimension relative to the post 205, can pass to enter a cup part 224 defined at least in part by the flange 220 of the lower coupling portion 194. The cup part 224 is on an opposite side of the flange 220 from the mating surface 226. Each receiver 217 also includes an elongated slot 230 that integrally forms an uninterrupted keyhole-shaped receiver 217 aperture with the entry aperture 228 in the mating surface 226 of the flange protruding from the lower coupling portion 194. Thus, to initially introduce the upper coupling portion 166 to the lower coupling portion 194 the two coupling portions 166, 194 are brought into close proximity to each other and the head 201 of each male stud 197 introduced into the cup part 224 through the entry aperture 228 of respective receivers 217. With the heads 201 extending into the cup part 224, a twisting force can then be imparted on at least one of the upper and lower coupling portions 166, 194 to urge the post 205 of each male stud 197 into the slot 230.

A raised facet 242 (FIG. 6) can optionally be provided adjacent to one or more, and optionally each of the receivers 217 to impart a force on the respective male studs 197 that urges the upper and lower coupling portions 166, 194 toward each other to minimize leakage of the gas stream from the coupler 168 when assembled. The raised facet 242 engages the heads 201 of the male studs 197 as the male studs 197 are being received within the receivers 217 and approaching their fully received locations along the slots 230. The raised facet 242 can be provided adjacent to a point along the slot 230 at which the head 201 will be located when the male studs 197 are considered to be fully received by the receivers 217. In other words, the raised facet 242 can be located at a location along the length of the slot 230 where the heads 201 of the male studs 197 will be located when the angular orientation of the upper coupling portion 166 relative to the lower coupling portion 194 has been fully adjusted to securely connect the first and second filter portions 80, 82 together.

The raised facet 242 is separated a greater distance in the axial direction along axis A-A from the mating surface 191 (FIG. 3) of the flange provided to the upper coupling portion 166 than a rear surface 245 of the flange 220 provided to the lower coupling portion 194. The enlarged entry apertures 228 can be formed in a portion of the flange 220 separated about the same distance from the mating surface 191 of the upper coupling portion 166 as the rear surface 245 to facilitate introduction of the heads 201 into the receivers 217. A ramped surface 248 extends between the raised facet 242 and the rear surface 245 of the flange 220 to gradually increase the extent to which the heads 201 of the male studs 197 are drawn into the receivers 217. The greater the extent two which the heads 201 are drawn into the receivers 217 the greater the force urging the upper and lower coupling portions 166, 194 together to form a generally leak-free connection.

As shown in FIGS. 7a and 7b, within the cup part 224 there can optionally be provided a retainer clip 234 adjacent to at least one of the plurality of keyhole-shaped receivers 217 to establish a locking receiver 238. The retainer clip 234 can be provided adjacent a single receiver 217, each of the receivers 217, or any number less than each of the receivers 217. The retainer clip 234 of the locking receiver 238, in an unbiased position, engages a portion of the male stud 197 adjacent to the head 201 received by the locking receiver 238. The retainer clip 234 includes an elongated canopy 252 formed as a cantilever made of a metal or other suitably-rigid material that extends behind the head 201 received within the locking receiver 238 to a point along the slot 230 between the head 201 and the entry aperture 228. A hook portion 255 extends from the canopy generally towards a point of the male stud 197 where the head 201 meets the post 205. With the male stud 197 fully received in the locking receiver 238 and separated from the entry aperture 228 by the hook portion 255 of the retainer clip 234 in its unbiased state, the retainer clip 234 interferes with removal of the male stud 197 from the locking receiver 238 without first manually lifting of the hook portion 255 from the rear surface 245 of the flange 220.

Although the upper coupling portion 166 is shown and described herein as supporting the male studs 197 and being telescopically insertable into the lower coupling portion 194, the lower coupling portion 194 is described as including the keyhole receivers 217, the invention is not so limited. Alternate embodiments can include an upper coupling portion 166 that defines the keyhole receivers 217 and other features describes as being provided to the lower coupling portion 194 herein without departing from the scope of the present invention. Likewise, according to such embodiments the lower coupling portion 194 can include the plurality of male studs 197 extending in the opposite axial direction, generally toward the upper coupling portion 166 without departing from the scope of the present invention.

A method of effecting assembly and installation of the filter assembly 26 is described below. The method is directed to installing the relatively long filter assembly 26 in a new or existing baghouse 20.

The method includes providing the first filter portion 80 with the pleated media 120. The mounting sleeve 100 is located at one axial end and the upper coupling portion 166 is located at the opposite axial end. Fluid may flow through both ends of the first filter portion 80.

The installer(s) located in the clean air plenum 42 connect together the first and second filter portions 80, 82. The second, lower filter portion 82 is held by one installer so it is at least partially in the clean air plenum 42 and at least partially in the dirty air plenum 40. The upper filter portion 80 is supported by another installer so it is entirely in the clean air plenum 42. The first and second filter portions 80, 82 are aligned along the axis A-A as shown in FIG. 2, and the upper and lower coupling portions 166, 194 are brought into axial engagement. The second filter portion 82 is supported so it extends through the opening 46 in the tube sheet 44. The gasket 210 is placed within the channel 208 prior to connecting the first and second filter portions 80, 82.

The relative angular orientation of at least one of the filter portions 80, 82, or at least one of the coupling portions 166, 194, is adjusted about axis A-A to align the head 201 of each male stud 197 with the entry aperture 228 portion of the respective keyhole-shaped receivers 217. With the heads 201 so aligned, the upper and lower coupling portions 166, 194 are brought together in the axial direction to an extent sufficient to cause the axial end 207 of the upper coupling portion 166 to telescopically extend into the lower coupling portion 194. Further, the head 201 of each male stud 197 is received within their respective keyhole-shaped receivers 217 through the entry aperture 228.

After the head 201 of each male stud 197 has been introduced into the cup part 224 by extending axially beyond the rear surface 245 of the flange 220 (FIGS. 7a and 7b), the angular orientation of the upper coupling portion 166 about axis A-A relative to the lower coupling portion 194 is adjusted. Of course either one of the upper or lower coupling portions 166, 194, or both of the upper and lower coupling portions 166, 194 can be rotated about axis A-A to accomplish the desired relative angular orientation adjustment. Rotating either or both of the upper and lower coupling portions 166, 194 about axis A-A causes the post 205 of each male stud 197 to exit the entry aperture 228 portion of the keyhole-shaped receivers 217 and enter the slot 230 portion.

As the relative angular orientation of the upper and lower coupling portions 166, 194 is adjusted, the bottom of one or more of the heads 201 contacts a ramped surface 248. This contact between the head 201 and the ramped surface 248 urges the upper and lower coupling portions 166, 194 together, thereby establishing a secure connection between the upper and lower coupling portions 166, 194, and minimizing leakage between the upper and lower coupling portions 166, 194.

The relative angular orientation adjustment continues until the head 201 of the one or more male studs 197 travels along a suitable extent of the ramped surface 248 to reach an elevated facet 242, marking a complete angular orientation adjustment between the upper and lower coupling portions 166, 194. With the one or more heads 201 disposed adjacent to the elevated facet 242, the head 201 is separated by or about the greatest axial distance from the rear surface 245 of the flange 220, which is on an opposite side of the flange 220 than the mating surface 226 of the lower coupling portion 194. Separated by this axial distance from the rear surface 245, the upper and lower coupling portions 166, 194 are urged together with the greatest, or nearly the greatest compressive force established by the coupler 168.

To minimize inadvertent disconnection of the upper and lower coupling portions 166, 194, the inward angled hook portion 255 of the retainer clip 234 travels over one or more of the heads 201 as the head(s) 201 approaches the elevated facet 242. Once the hook portion 255 travels beyond the head(s) 201, the substantially-resiliently bias of the retainer clip 234 toward the rear surface 245 urges the hook portion toward the rear surface to interfere with adjustment of the head 201 from the elevated facet 242 back toward the entry aperture 228.

To disconnect the upper and lower coupling portions 166, 194, the retainer clip 234 can be manually displaced to elevate a lowermost edge of the hook portion 255 a suitable distance above the rear surface 245 to allow the head 201 to pass thereunder. The relative angular orientation of the upper and lower coupling portions 166, 194 is again adjusted to position the post 205 of each male stud 197 closer to the entry aperture 228 than it was when disposed adjacent to the elevated facet 242, at which time the retainer clip 234 can be allowed to return to its unbiased position. When each head 201 is once again aligned with the entry aperture 228, the upper and lower coupling portions 166, 194 can be axially separated along axis A-A to disconnect the first and second filter portions 80, 82.

It will be apparent that a filter assembly 26 with a slightly different structure may optionally include a third and even additional filter portions (not shown). The third or additional filter portions are located between and connected to the upper filter portion 80 and the second, lower filter portion 82 to provide flexibility in establishing a length of the filter assembly 26. The third filter portion would have open axial ends and connecting structure at both ends.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A filter assembly to be secured within a baghouse for removing at least a portion of particulate matter entrained within a gas stream, the baghouse being divided into a plurality of plenums by a tube sheet that defines at least one opening through which the gas stream can travel between the plenums, the filter assembly, including:
    a first axially-extending filter portion including a mounting structure provided adjacent to a first axial end to couple the first filter element to a support adjacent to the at least one opening defined by the tube sheet, a first perforated frame coupled to and extending from the mounting structure, and a first pleated filter media disposed adjacent to the first perforated frame;
    a second axially-extending filter portion including a second perforated frame and a second pleated filter media disposed adjacent to the second perforated frame; and
    a coupler for connecting the first filter portion to the second filter portion and establishing fluid communication between the first and second filter portions when connected, the coupler including:
        a first coupling portion including a side wall defining an interior passage through which the gas stream can pass in an axial direction between the first and second filter portions, and one or more flanges projecting from said side wall, said one or more flanges supporting a plurality of male studs projecting parallel to the axial direction, and
        a second coupling portion including a plurality of female keyhole-shaped receivers spaced apart and open in a direction parallel to the axial direction for receiving at least a portion of the male studs by insertion of the male studs parallel to the axial direction and coupling the first coupling portion to the second coupling portion.

2. The filter assembly according to claim 1, wherein each of said protruding studs has a head and a stud post extending parallel to the axial direction between the head and the flange, the head has a lateral dimension that is substantially larger than a lateral dimension of the stud post extending between the head and the flange.

3. The filter assembly according to claim 1, wherein the one or more flanges extending from the side wall of the first coupling portion include a single flange that extends radially outward from and circumferentially about an external surface of the side wall and supports each of the plurality of male studs.

4. The filter assembly according to claim 1, wherein the one or more flanges are spaced apart from an axial end of the side wall that is to be received within an internal passage defined by the second coupling portion when the first and second coupling portions are coupled together.

5. The filter assembly according to claim 1 further comprising a retainer clip adjacent to at least one of the keyhole-shaped receivers to establish a locking receiver, wherein the retainer clip engages the male stud received by the locking receiver to interfere with removal of the male stud from the locking receiver.

6. The filter assembly according to claim 5, wherein the retainer clip is manually adjustable to an unlocked position where the retainer clip does not interfere with removal of the male stud from the locking receiver.

7. The filter assembly according to claim 5, wherein the retainer clip is positioned adjacent to fewer than all of the keyhole-shaped receivers.

8. The filter assembly according to claim 5, wherein the plurality of keyhole-shaped receivers are formed in a receiver flange extending circumferentially about a side wall defining an internal passage of the second coupling portion through which the gas stream can pass in the axial direction between the first and second filter portions.

9. The filter assembly according to claim 8, wherein the retainer clip is coupled to the receiver flange and separated from the one or more flanges of the first coupling portion by the receiver flange.

10. The filter assembly according to claim 1 further including a raised facet formed adjacent to each keyhole-shaped receiver for engaging the heads of the male studs as the male studs are being received within the keyhole-shaped receivers to urge the first and second coupling portions toward each other.

11. The filter assembly according to claim 10 further including a ramped surface extending between the keyhole-shaped receiver and the raised facet for providing an axial direction urging force upon relative rotation between the first and second filter portions.

12. The filter assembly according to claim 1 further including a gasket for sealingly engaging both the first and second coupling portions when connected to minimize leakage of the gas stream between the first and second filter portions.

13. The filter assembly according to claim 1, wherein at least one of the first and second filter portions includes a flanged collar adjacent to one axial end of a pleated filter medium adjacent to the coupler, said flanged collar including a side wall to circumferentially surround a potting compound and an end portion of the pleated filter medium projecting into said potting compound to resist separation of the pleated filter from the potting compound.

14. A filter assembly to be secured within a baghouse for removing at least a portion of particulate matter entrained within a gas stream, the baghouse being divided into a plurality of plenums by a tube sheet that defines at least one opening through which the gas stream can travel between the plenums, the filter assembly including:
   first axially-extending filter means for removing at least a portion of particulate matter entrained within a gas stream to be supported adjacent to the at least one opening defined by the tube sheet;
   second axially-extending filter means for removing at least a portion of particulate matter entrained within the gas stream, the second filter means to be coupled to the first filter means; and
   coupling means including a first coupling portion to be mated to a second coupling portion for establishing axial fluid communication between the first filter means and the second filter means, the coupling means including at least one axially extending male stud for axially-aligned mating with at least one female keyhole-shaped receiver;
   means for axially urging the first and second coupling portions together when the first coupling portion is mated to the second coupling portion and the first and second filter means are relatively rotated; and
   means for releasably interfering with separation of the first coupling portion from the second coupling portion once the first coupling portion has mated with the second coupling portion.

15. The filter assembly according to claim 14 further including a gasket that sealingly engages both the first and second coupling portions when the first coupling portion is mated with the second coupling portion to form a substantially gas-tight seal.

16. The filter assembly according to claim 14, wherein at least one of the first and second filter means includes a flanged collar adjacent to one axial end of a pleated filter medium adjacent to the coupler, said flanged collar including a side wall to circumferentially surround a potting compound and an end portion of a respective pleated filter medium projecting into said potting compound to resist separation of the pleated filter medium from the potting compound.

17. A baghouse for filtering at least a portion of particulate matter from a gas stream including:
   a housing divided into at least first and second plenums by a substantially planar tube sheet defining a plurality of openings establishing gaseous communication between the first and second plenums;
   a plurality of filter assemblies to be secured adjacent to the openings defined by the tube sheet, said filter assemblies including:
      a first axially-extending filter portion including a mounting structure provided adjacent to a first axial end to couple the first filter element to a support adjacent to the at least one opening defined by the tube sheet, a first perforated frame coupled to and extending from the mounting structure, and a first pleated filter media disposed adjacent to the first perforated frame;
      a second axially-extending filter portion including a second perforated frame and a second pleated filter media disposed adjacent to the second perforated frame; and
      a coupler for connecting the first filter portion to the second filter portion and establishing axial fluid communication between the first and second filter portions when connected, the coupler including:
         a first coupling portion including a side wall defining an interior passage through which the gas stream can pass in an axial direction between the first and second filter portions, and one or more flanges projecting from said side wall, said one or more flanges supporting a plurality of male studs projecting parallel to an axial direction, and
         a second coupling portion including a plurality of female keyhole-shaped receivers spaced apart and open in a direction parallel to the axial direction for receiving at least a portion of the male studs by insertion of the male studs parallel to the axial direction and coupling the first coupling portion to the second coupling portion.

* * * * *